United States Patent [19]

Dietschreit

[11] Patent Number: 4,911,274
[45] Date of Patent: Mar. 27, 1990

[54] SAFETY COUPLING
[75] Inventor: Horst Dietschreit, Mülheim/Ruhr, Fed. Rep. of Germany
[73] Assignee: Siebtechnik GmbH, Mülheim/Ruhr, Fed. Rep. of Germany
[21] Appl. No.: 223,607
[22] Filed: Jun. 23, 1988
[30] Foreign Application Priority Data
Jun. 27, 1987 [DE] Fed. Rep. of Germany ....... 3721292
[51] Int. Cl.⁴ .............................................. F16D 43/20
[52] U.S. Cl. .............................. 192/56 R; 192/56 L; 192/108
[58] Field of Search .............. 192/56 R, 56 L, 89 QT, 192/108, 109, 114 R; 464/39

[56] References Cited
U.S. PATENT DOCUMENTS
447,413   3/1891  Perry ................................ 192/56 R
2,313,708 3/1943  Waller .

FOREIGN PATENT DOCUMENTS
  85997  9/1895  Fed. Rep. of Germany .
  94535 11/1896  Fed. Rep. of Germany .
  98233 11/1896  Fed. Rep. of Germany .
 840638  6/1952  Fed. Rep. of Germany .
1070885 12/1959  Netherlands ...................... 192/56 R
0474650  6/1975  U.S.S.R. .................................. 464/39
2122282  1/1984  United Kingdom .............. 192/56 R Primary Examiner—Rodney H. Bonck
Assistant Examiner—Andrea Pitts
Attorney, Agent, or Firm—Robert W. Becker & Associates

[57] ABSTRACT

A safety coupling having a first drive/output element that is coupled with a second drive/output element via two disengageable coupling elements in the form of two-armed levers that are pivotably disposed on the second drive/output element. First lever arms of these levers are counterstops that in an engaged state of the coupling are disposed in the path of movement of stops that are disposed on the first drive/output element. Second lever arms are supported against a support plate that is shiftable against the force of a compression spring. When an unacceptably high torque occurs, the levers, as a result of forces acting upon the first lever arms, are first pivoted against the compression spring and shift the support plate. After a prescribed pivot angle has been exceeded, the second lever arms, under the effect of the compression spring, pivot further into an end position in which the first lever arms are disposed completely beyond the path of movement of the stops; the coupling is disengaged. Reengagement is effected by shifting the support plate by rotating a nut when the drive/output elements are stopped until the levers can be manually returned to the engaged position.

9 Claims, 2 Drawing Sheets

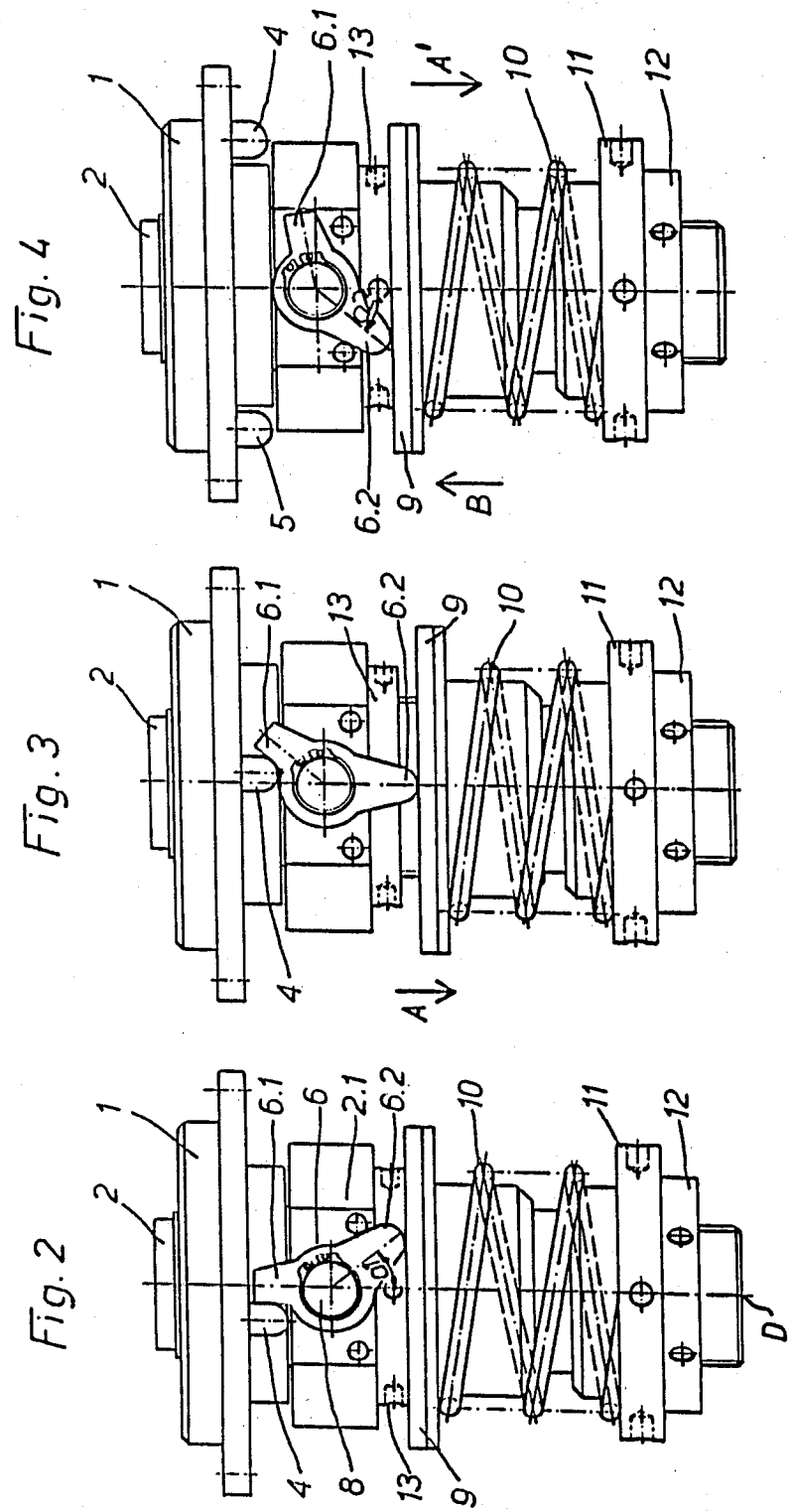

SAFETY COUPLING

BACKGROUND OF THE INVENTION

The present invention relates to a safety coupling having a first drive/output element that, via a coupling mechanism which is disengaged against spring force at a predetermined maximum torque, is connected to a coaxially disposed second drive/output element.

Safety couplings of this general type are known. Their task is to protect machines from becoming overloaded by limiting the torque that can be transmitted, and to prevent damage to tools and workpieces. Such couplings are generally installed on shafts at that location where the greatest torque occurs during sudden retardation of the load.

In one known safety coupling of the aforementioned general type, which is designated as a "free shifting coupling", the two drive/output elements are connected via a coupling mechanism that is provided with a row of ball bearings that are disposed along the periphery of a ball race that is connected with one of the drive/output elements. The ball bearings are under the effect of a pressure disk upon which acts the force of a cup or plate spring; due to the force of this plate spring, the ball bearings are partially pressed out of the ball race and into cups disposed on a flange ring that is connected to the other drive/output element. When a prescribed maximum torque is exceeded, which torque is determined by the force of the plate spring, the ball bearings are pressed out of their cups and are displaced against the force of the plate spring. In this state, the coupling is disengaged and remains in this state under the effect of an arresting mechanism. A drawback of this known free shifting coupling is that even when the coupling is disengaged, a frictional moment is transmitted as a result of the ball bearings that are disposed between the flange ring and the pressure plate, with considerable material wear occurring at this location. This is a tremendous drawback, especially if the safety coupling is to be used on machines that still have a long slow-down time after the coupling has been disengaged and the machine has been turned off.

It is therefore an object of the present invention to provide a safety coupling of the aforementioned general type that operates as a free shifting coupling and that in the disengaged state exhibits only minimal frictional moment, so that in particular the coupling mechanism itself is no longer subjected to any frictional forces that produce wear.

BRIEF DESCRIPTION OF THE DRAWINGS

This object, and other objects and advantages of the present invention, will appear more clearly from the following specification i conjunction with the accompanying schematic drawings, in which:

FIG. 2 is a side view of the coupling of FIG. 1 in the engaged state

FIG. 3 i a side view of the coupling of FIG. 1 during the disengagement process; and FIG. 4 is a side view of the coupling of FIG. 1 in the disengaged state.

SUMMARY OF THE INVENTION

Figure 1:
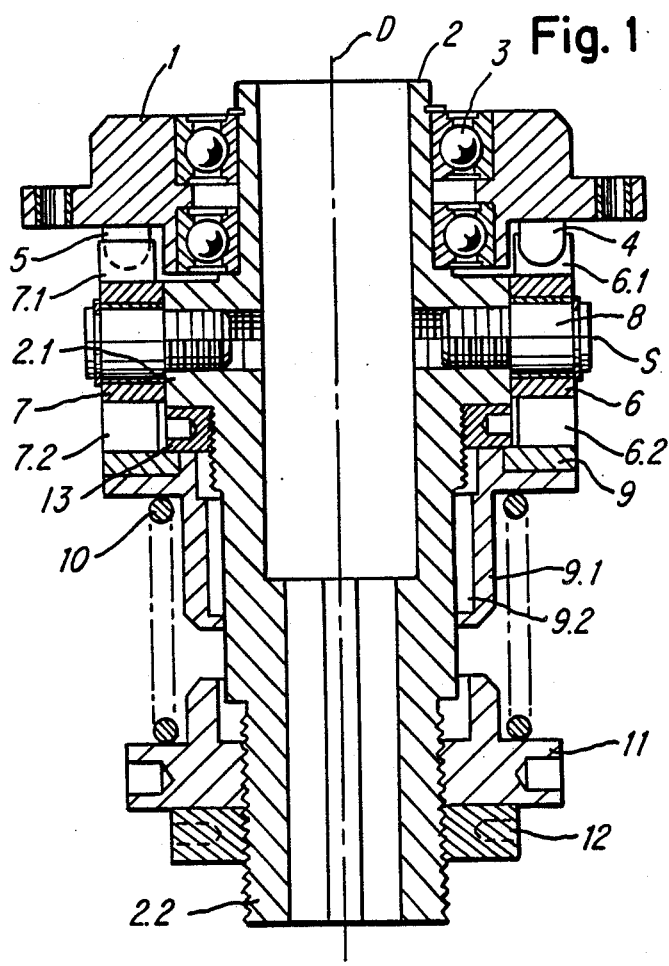
FIG. 1 is a longitudinal cross-sectional view through one exemplary embodiment of the inventive safety coupling.

The safety coupling of the present invention comprises: a first drive/output element; a second drive/output element that is coaxially disposed relative to the first drive/output element so that the first and second drive/output elements have a common axis of rotation; a compression spring that is mounted on the second drive/output element and exerts a spring force in the direction of the axis of rotation; at least two stops disposed on the first drive/output element; two-armed levers that are mounted on the second drive/output element in such a way as to be pivotable about pivot axes that are disposed perpendicular to the axis of rotation, with the two-armed levers each having a first lever arm that is provided with a counterstop against which a respective one of the stops of the first drive/output element rests in an engaged position, whereby the two-armed levers are pivotable, against the force of the compression spring, into a disengaged position when a predetermined maximum torque acts upon the coupling, in which disengaged position the counterstops are disposed beyond the path of movement of the stops of the first drive/output element; and a support plate that is displaceably disposed on the second drive/output element, with the support plate being oriented perpendicular to the axis of rotation and being displaceable on the second drive/output element in the direction of this axis of rotation and against the force of the compression spring, with each two-armed lever also having a second lever arm that, in the engaged position, is supported against the support plate at an acute angle to the support plate.

As will be described subsequently in conjunction with a preferred embodiment of the present invention, the inventive safety coupling not only resolves the aforementioned object in that it represents an actual free shifting coupling where in the disengaged position the coupling elements are completely released and no forces that effect wear act upon these coupling elements, but rather the inventive safety coupling also has further advantages. For example, by appropriately dimensioning and disposing the coupling elements, it is possible with the inventive safety coupling to keep the coupling elements from being continuously loaded with the complete tensioning force, and to rather load the coupling elements with only that force that results from the torque that is to be transmitted at any given time. Furthermore, it is also possible to achieve a condition where radial loads that act upon the drive/output elements, and that occur, for example, during the use of belt pulleys, have no effect upon the operation of the coupling elements or the setting of the maximum torque at which the coupling disengages.

Further specific features of the present invention will be described in detail subsequently.

DESCRIPTION OF PREFERRED EMBODIMENTS

Referring now to the drawings in detail, the illustrated safety coupling includes a disk-like first drive/output element 1 that is mounted via ball bearings 3 on a second drive/output element 2, which is embodied as a shaft. The two drive/output elements 1 and 2 are disposed coaxially relative to one another, and are rotatable about a common axis of rotation D. In the region immediately before the first drive/output element 1, the second drive/output element 2 is provided with a widened portion 2.1 through which a pin or bolt 8 extends at right angles to the axis of rotation D. Mounted on each end of the bolt 8 is a respective two-armed lever 6 or 7 that s pivotable about the axis S of the bolt 8. These two-armed levers 6 and 7 represent the coupling elements of the inventive coupling. For this purpose, the lever arms 6.1 and 7.1 that are directed toward the first drive/output element 1 are provided with counterstops that cooperate with stops that are disposed as axially extending projections 4, 5 on the side face of the first drive/output element 1.

The levers 6 and 7 are provided with second lever arms 6.2 and .2 that are disposed at a prescribed obtuse angle to the first lever arms 6.1 and 7.1 respectively. These second lever arms 6.2 and 7.2 rest against a support plate 9 that is disposed on that side of the widened portion 2.1 of the second drive/output element 2 that is remote from the first drive/output element 1. Via a compression spring 10 that is disposed coaxial to the axis of rotation D, the support plate 9 is under a force that acts in the direction toward the levers 6 and 7. That end of the compression spring 10 remote from the levers 6 and 7 is supported against a spring support 11 that is secured via a lock nut 12 to that part 2.2 of the second drive/output element 2 that is remote from the first drive/output element 1.

The support plate 9 is connected or associated with a guide sleeve 9.1 that rests via a sleeve or friction bearing 9.2 against the central portion of the second drive/output element 2 and can be shifted on the latter. Furthermore, disposed between the support plate 9 and the widened portion 2.1 of the second drive/output element 2 is a nut 13 that on the one hand serves as an abutment for the support plate 9, with rotation of the nut 13 permitting the support plate 9 to be shifted in the direction counter to the force of the compression spring 10.

The inventive safety coupling illustrated in FIGS. 1 to 4 operates as follows:

In the engaged state of the inventive coupling illustrated in FIG. 2, the stops 4 and 5 rest against the first lever arms 6.1 and 7.1, which are embodied as counterstops, and the second lever arms 6.2 and 7.2 are pressed against the support plate 9 and are disposed at an angle "a1" to the support plate 9 relative to a line that is perpendicular to the surface of the support plate. The support plate 9 is under the force of the compression spring 10 and is pressed by the latter against the nut 13. The force exerted by the compression spring 10 against the support plate 9 can be adjusted by the position of the spring support 11 on the rear part 2.2 of the second drive/output element 2.

The forces that act upon the first lever arms 6.1 and 7.1 are determined by the torque that is t be transmitted. The coupling remains in the engaged state illustrated in FIG. 2, in which the torque is transmitted from the first drive/output element 1 via the levers 6 and 7 to the second drive/output element 2, as long as the forces that act upon the first lever arms 6.1 and 7.1 are not sufficient to shift the support plate 9 against the force of the compression spring 10 via the second lever arms 6.2 and 7.2.

This shifting does not occur until, as illustrated in FIG. 3, an overload situation occurs in which, for example on one of the two drive/output elements, an unacceptably great resistance occurs and the torque that is to be transmitted becomes greater, so that, as shown in FIG. 3, the levers and 7 are pivoted in a clockwise direction, whereby the support plate 9 is shifted in the direction A against the force of the compression spring 10. The pivoting of the two levers 6 and 7 is effected in two movement stages. In the first movement stage, pivoting is effected accompanied y displacement of the support plate 9 in the direction A against the force of the compression spring 10 to a point at which the second lever arms 6.2 and 7.2 rest against the support plate 9 at an angle of 0° relative to a line that extends perpendicular to the support plate. This state is illustrated in FIG. 3. As the levers 6 and 7 are pivoted still further in a clockwise direction, the second movement stage begins. In this stage, as can be seen in FIG. 4, the further pivoting is effected under the effect of the force of the compression spring 10 accompanied by a corresponding movement of the support plate 9 in the direction of the arrow B. The result of this is that the levers 6 and eventually lock in the position illustrated in FIG. 4, whereby the first lever arms 6.1 and 7.1 have been completely withdrawn from the path of movement of the stops 4 and 5. In this state, the second lever arms 6.2 and 7.2 rest upon the support plate 9 and are disposed at an acute angle "a2" relative to a line perpendicular to the support plate. However, in the meantime the support plate 9 has again returned to its starting position, where it rests upon the nut 13. In the state illustrated in FIG. 4, the coupling is disengaged and the drive/output element 1 can rotate freely relative to the drive/output element 2 without any appreciable friction occurring, which could lead to wear.

The enqaged state illustrated in FIG. 2, as well as the disengaged state illustrated in FIG. 4, are both stable states, since in both states the support plate 9 rests securely against the nut 13 under the force of the compression spring 10.

The inventive safety coupling is reset from the disengaged state illustrated in FIG. 4 into the engaged state illustrated in FIG. 2, when the drive/output elements are at a standstill, by rotating the nut 13 in such a way that the support plate 9 shifts in the direction of the arrow A' (FIG. 4). As soon as the amount of displacement has achieved a certain predetermined value, the levers 6 and 7 can be manually pivoted back into the position illustrated in FIG. 2. The nut 13 is then rotated in the opposite direction until the support plate 9 has also again reached the position illustrated in FIG. 2, in which position the two lever arms 6.2 and 7.2 rest against the support plate. The coupling is now again engaged.

Since during disengagement of the coupling the stops 4, 5 and the counterstops 6.1 and 7.1, which act as coupling elements, carry out a quasi scissors-like movement relative to one another, the inventive safety coupling that is illustrated in FIG. 1 to 4, and which is in the form of free shifting coupling, can also be designated as a "shearing coupling".

The present invention is, of course, in no way restricted to the specific disclosure of the specification and drawings, but also encompasses any modifications within the scope of the appended claims.

What is claimed is:

1. A safety coupling comprising:
   a first drive/output element;
   a second drive/output element that is coaxially disposed relative to said first drive/output element so that said first and second drive/output elements have a common axis of rotation;

a compression spring that is mounted on said second drive/output element and exerts a spring force in the direction of said axis of rotation;

at least two stops disposed on said first drive/output element;

two-armed levers mounted on said second drive/output element in such a way as to be pivotable about pivot axes that are disposed perpendicular to said axis of rotation, with said levers each having a first lever arm that is provided with a counterstop against which a respective one of said stops of said first drive/output element rests in an engaged position of said coupling whereby said levers are pivotable, against the force of said compression spring, into a disengaged position when a predetermined torque acts upon said coupling, in which disengaged position said counterstops are disposed beyond the path of movement of said stops of said first drive/output element;

a support plate that is displaceably disposed on said second drive/output element, with said support plate being oriented perpendicular to said axis of rotation and being displaceable on said second drive/output element in the direction of said axis of rotation and against the force of said compression spring, with each of said levers also having a second lever arm that, in said engaged position, is supported against said support plate at an acute angle to said support plate; and end stop means being positioned between said support plate and a widened portion on said second drive/output element against which said support plate rests in both said torque transmitting engaged position and said non-torque transmitting disengaged position.

2. A safety coupling according to claim 1, in which said second drive/output element has a region that is disposed in the immediate vicinity of said first drive/output element and is provided with a widened portion through which is guided, at right angles to said axis of rotation, a bolt that forms said pivot axes.

3. A safety coupling according to claim 2, in which said support plate is movable in an axial direction relative to said bolt.

4. A safety coupling according to claim 1, which includes a spring support that is fixed in position on said second drive/output element via a lock nut, with said compression spring being a helical spring that is disposed coaxial to said axis of rotation and has two ends, with one of said ends being supported on said spring support, and with the other of said ends being supported against said support plate.

5. A safety coupling according to claim 4, which includes a guide sleeve that rests against a central portion of said second drive/output element via a sleeve bearing with said guide sleeve being displaceable upon said second drive/output element, and with said support plate being supported on said guide sleeve.

6. A safety coupling according to claim 1, in which said end stop means is formed by a threaded nut that is screwed onto external thread means of said second drive/output element.

7. A safety coupling according to claim 6, in which, with said first and second drive/output elements being at a standstill, and with the position of said threaded nut shifted, said levers are adapted to be pivoted back into said engaged position.

8. A safety coupling according to claim 1, in which said second drive/output element is in the form of a shaft, and said first drive/output element is rotatably mounted on said second drive/output element.

9. A safety coupling comprising:
a first drive/output element;
a second drive/output element that is coaxially disposed relative to said first drive/output element so that said first and second drive/output elements have a common axis of rotation, said second drive/output element being constructed as a shaft upon which said first drive/output element is rotatably journalled;
a compression spring that is mounted on said second drive/output element and exerts a spring force in the direction of said axis of rotation;
at least two stops rigidly disposed on said first drive/output element;
two-armed levers provided as coupling elements of said safety coupling that disengages against the spring force at a predetermined torque and mounted on said second drive/output element in such a way as to be pivotable about pivot axes that are disposed perpendicular to said axis of rotation, with said levers each having a first lever arm that is provided with a counterstop against which a respective one of said stops of said first drive/output element rests in an engaged position of said coupling, whereby said levers are pivotable, against the force of said compression spring, into a disengaged position when the predetermined torque acts upon said coupling, in which disengaged position said counterstops are disposed beyond the path of movement of said stops of said first drive/output element;
a support plate that is displaceably disposed on said second drive/output element, with said support plate being oriented perpendicular to said axis of rotation and being displaceable on said second drive/output element in the direction of said axis of rotation and against the force of said compression spring, with each of said levers also having a second lever arm that, in said engaged position, is supported against said support plate at an acute angle to said support plate;
said second lever arm forms an obtuse angle with the first lever arm in the engaged position of said coupling as well as an acute angle as to said support plate in the engaged position and being supported on said support plate;
a spring support that is fixed in position on said second drive/output element via a lock nut, with said compression spring being a helical spring that is disposed coaxial to said axis of rotation and having two ends, with one of said ends being supported on said spring support, and with the other of said ends being supported against said support plate;
a guide sleeve that rests against a central portion of said second drive/output element via a sleeve bearing, with said guide sleeve being displaceable upon said second drive/output element, and with said support plate being supported on said guide sleeve;
end stop means against which said support plate rests in both said engaged position and said disengaged position, said end stop means being formed by a threaded nut that is screwed onto external thread means of said second drive/output element; in which, with said first and second drive/output elements being at a standstill, and with the position of said threaded nut shifted, said levers are adapted to be pivoted back into said engaged position; and said support plate being displaceable from said engaged position by pivoting of said levers under effectiveness of torque first into one position in which the second lever arms are positioned perpendicular thereto and finally being shiftable back into a disengaged position via further pivoting of the levers under effectiveness of the spring force, said second lever arms in the disengaged position locking into a position in which said second lever arms engage against said support plate at an acute angle and in which said counterstops are located outside the path of movement of said stops, whereby said support plate engages said end stop means in engaged as well as disengaged positions.

* * * * *